United States Patent [19]
Wallner et al.

[11] Patent Number: 6,107,704
[45] Date of Patent: Aug. 22, 2000

[54] MICROELECTRIC MOTOR

[75] Inventors: Herbert Wallner; Jochen Knittel, both of Schönaich; Ulrich Beckord, Gärtringen, all of Germany

[73] Assignee: Dr. Fritz Faulhaber GmbH & Co., KG, Schönaich, Germany

[21] Appl. No.: 08/989,968

[22] Filed: Dec. 12, 1997

[30] Foreign Application Priority Data

Dec. 12, 1996 [DE] Germany .................... 196 51 660

[51] Int. Cl.⁷ .................... H02K 5/22; H02K 11/00
[52] U.S. Cl. .................... 310/40 MM; 310/89; 310/68 B
[58] Field of Search .................... 310/40 MM, 68 B, 310/68 D, 89, 68 R

[56] References Cited

U.S. PATENT DOCUMENTS

| 4,899,075 | 2/1990 | Hasebe .................... 310/257 |
| 5,502,343 | 3/1996 | Yoshimura et al. .................... 310/220 |

*Primary Examiner*—Thomas M. Dougherty
*Assistant Examiner*—Judson H. Jones
*Attorney, Agent, or Firm*—Robert W. Becker & Associates

[57] ABSTRACT

A microelectric motor has a housing and a rotatable motor shaft extending axially in the housing. The housing has an axial length. A rotor is fastened to the motor shaft and a stator is positioned in the housing for cooperating with the rotor. A receiving chamber is provided in the housing within its axial length. The transducer is positioned in the receiving chamber.

20 Claims, 1 Drawing Sheet

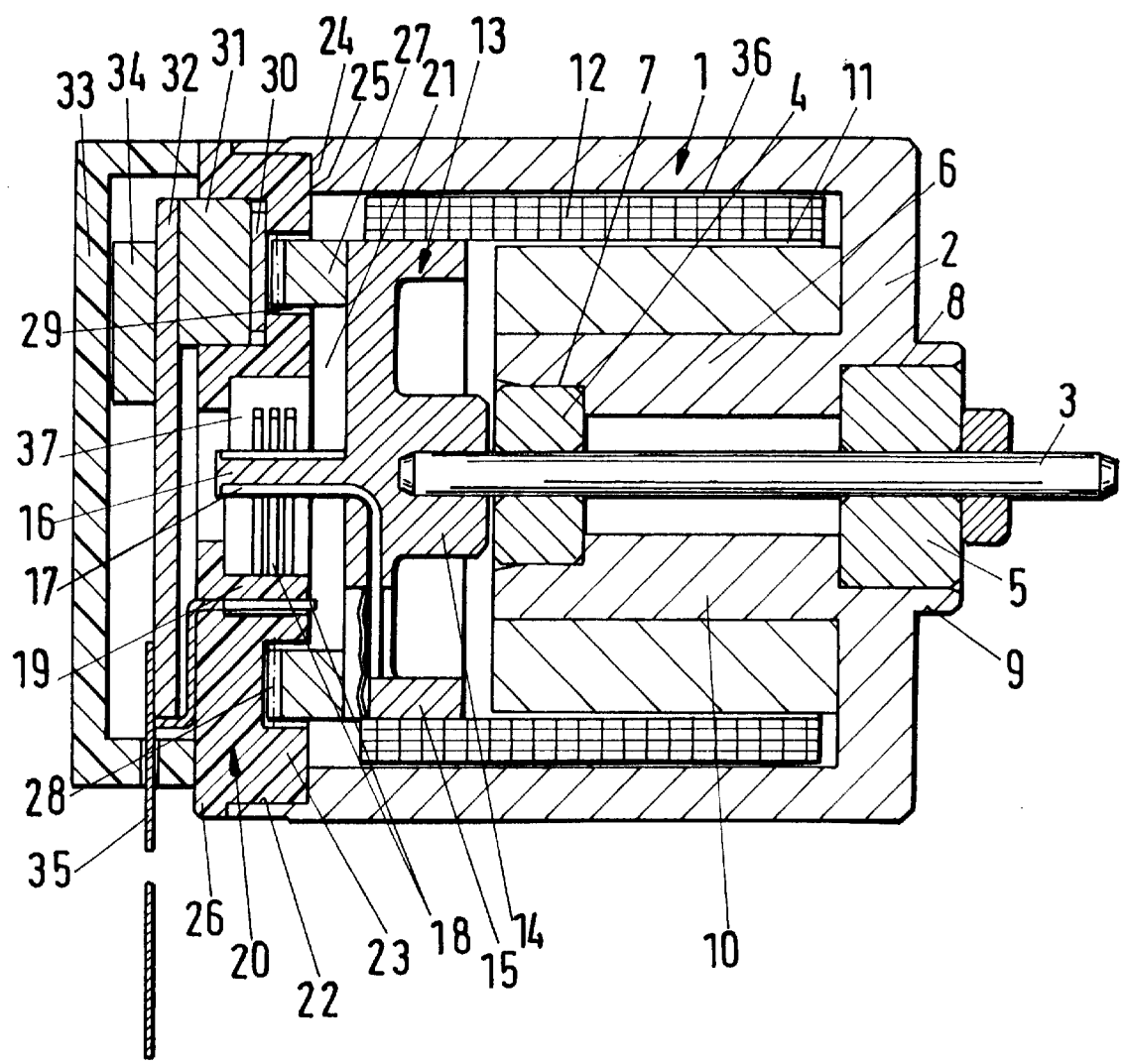

MICROELECTRIC MOTOR

BACKGROUND OF THE INVENTION

The present invention relates to a microelectric motor having a housing with an axial length in which housing a motor shaft is rotatably supported, whereby the motor shaft carries a rotor cooperating with a stator.

It is known to provide such microelectric motors at their end face with a magnetic transducer. However, this results in a great axial length. Often, such transducers have a greater diameter than the microelectric motors so that, in addition to the enlarged axial length, an increase of the diameter of such a component results also. Accordingly, they require a respectively large mounting space which, however, for certain applications is not available.

It is therefore an object of the invention to embody the microelectric motor of the aforementioned kind such that its dimensions are not enlarged by a transducer or, at most, are enlarged only minimally.

SUMMARY OF THE INVENTION

The microelectric motor of the present invention is primarily characterized by:

A housing;
A rotatable motor shaft extending axially in the housing;
The housing having an axial length;
A rotor fastened to the motor shaft;
A stator positioned in the housing and cooperating with the rotor;
A receiving chamber provided in the housing within the axial length;
A transducer positioned in the receiving chamber.

Preferably, the transducer comprises a transmitter ring fixedly connected to the rotor and a sensor attached to the housing and positioned opposite the transmitter ring.

The transmitter ring is preferably a magnet ring.

The magnet ring expediently is axially magnetized.

The transmitter ring may have teeth uniformly distributed about its circumference.

The transmitter ring has alternating polarity about its circumference.

The sensor is preferably a magnetoresistive sensor.

The transducer further comprises an evaluation circuit.

The evaluation circuit is preferably an ASIC.

The evaluation circuit expediently transforms signals received from the sensor into rectangular impulses.

Advantageously, the microelectric motor further comprises a support for the evaluation circuit and the sensor, wherein the sensor and the evaluation circuit are connected to opposite sides of the support.

The housing may comprise a cover and the support is preferably positioned inside the cover.

The housing may comprise a lid having a recess wherein the transmitter ring engages the recess.

The sensor is preferably arranged in the lid.

The rotor may comprise a collector plate attached to the motor shaft, wherein the transmitter ring is attached to the electro plate.

The rotor may further comprise a coil connected to the collector plate.

The collector plate may comprise a projection having collector lamellas.

The housing expediently comprises a lid having a cutout and the projection engages the cutout.

The housing may have a diameter of approximately 15 mm and an axial length of 18 mm.

In the inventive microelectric motor, the transducer is arranged within the axial length of the housing. Accordingly, the microelectric motor, despite the transducer, does not have a greater diameter and also not a greater length than a conventional microelectric motor without transducer. For example, in one embodiment, the housing diameter is only approximately 15 mm and the axial length of the motor is only approximately 18 mm. Such small motors with integrated transducers can be used substantially without any limitation for various applications because they require only a small mounting space.

BRIEF DESCRIPTION OF THE DRAWING

The object and advantages of the present invention will appear more clearly from the following specification in conjunction with the accompanying only drawing showing an axial section of the inventive microelectric motor.

DESCRIPTION OF PREFERRED EMBODIMENTS

The present invention will now be described in detail with the aid of a specific embodiment utilizing the only FIGURE.

The motor is a micromotor of very small dimensions. The motor in the shown embodiment has a diameter of approximately only 15 mm and an axial length of approximately only 18 mm. It comprises a housing with a cup 1 having a bottom 2 through which the motor shaft 3 penetrates. The motor shaft 3 is supported by at least one bearing, in the shown embodiment by two bearings 4 and 5, in a rotatable manner within the housing. The bearing 4 is arranged at the free end of a cylindrical annular wall 6 extending coaxially about the motor shaft 3 and projecting from the housing bottom 2 into the housing cup 1. Preferably, the annular wall 6 is a unitary part of the interior of the housing cup 1. For receiving the bearing 4, the annular wall 6 is provided at its inner wall with an annular groove 7 engaged by the bearing 4. At the level of the housing bottom 2 the annular wall 6 is provided with a further annular groove 8 into which the bearing 5 is inserted. The housing bottom 2 has an opening in the area of the annular wall 6 so that the bearing 5 and the motor shaft 3 can be simply inserted. An annular wall 9 projects from the underside of the housing bottom 2 and surrounds the portion of the bearing 5 projecting from the housing cup 1. The motor shaft 3 itself is axially secured in a manner known per se within the housing cup 1.

At least one permanent magnet 10 is fastened to the annular wall 6 whereby its axial length is preferably the same as the axial length of the annular wall 6. The permanent magnet 10 surrounds the motor shaft 3 and is itself surrounded by a coil 12 providing an annular gap 11 about the permanent magnet 10. The annular wall 6, to which the annular permanent magnet 10 is fastened, functions as a magnet support and may be comprised of steel or aluminum. The coil 12 has a minimal spacing to the housing bottom 2 and projects axially past the permanent magnet 10. The end of the coil 12 facing away from the housing bottom 2 is fixedly connected to the collector plate 13 which is comprised of an electrically insulating material, especially a plastic material. The collector plate 13 is fastened to the motor shaft 3 and has a centrally arranged projection 14 oriented toward the annular wall 6. The motor shaft 3 extends into this projection 14. At its edge, the collector plate 13 is provided with a peripheral cylindrical wall 15 which, in the radial direction, is arranged at the same level as the permanent magnet 10 and faces the magnet 10. The cylindrical wall 15 surrounds the projection 14 at a spacing and is spaced axially from the permanent magnet 10.

At a side opposite the projection 14, the collector plate 13 is provided with a projection 16 which is arranged coaxially to the motor shaft 3, as is the projection 14. The projection 16 has a smaller width, respectively, smaller diameter than the projection 14. Collector lamellas 17 in the form of copper or precious metal lamellas are provided at the projection 16. A brush 18 contacts in a manner known per se the collector lamellas 17 whereby the brush 18 is provided within a brush holder 19. The brush holder 19 is mounted within a housing lid 20 of the housing inserted into a receiving chamber 21 of the housing cup 1. The receiving chamber 21 is provided at the free end of the housing cup 1. The end of the cylindrical wall of the housing cup 1 facing away from the bottom 2 is provided at its inner side with a circumferential depression 22 in which the housing lid 20 is engaged with its circumferential edge 23. The cylindrical wall of the housing cup 1 at the depression 22 is thinner than in the adjacent area extending to the housing bottom 2. The housing lid 20 is comprised of electrically insulating material, preferably of plastic material, and rests with the end face 24 of its peripheral edge 23 at a radially extending circumferential shoulder surface 25 of the depression 22.

The housing lid 20 rests with a flange 26 that is oriented radially outwardly on the end face of the housing cup 1. The outer diameter of the flange 26 corresponds to the outer diameter of the cylindrical wall of the housing cup 1.

A transmitter ring 27 is fastened to the collector plate 13, preferably by an adhesive, and is arranged coaxially to the motor shaft 3, as is the collector plate 13. The transmitter ring 27 has teeth 28 at the side facing the housing lid 20. The teeth 28 are arranged about the circumference of the transmitter ring 27 at a uniform spacing to one another. In the shown embodiment, the transmitter ring 27 is provided about its circumference with 64 teeth. The transmitter ring 27 extends into a recess in the form of an annular groove 29 which is provided at the underside of the housing lid 20 facing the collector plate 13. In the area of this annular groove 29, a magnetoresistive sensor 30 is provided in the housing lid 20 and is spaced at a small distance opposite the transmitter ring 27. The sensor 30 is positioned on a support 31 which is fastened within the housing lid 20. The sensor support 31 is itself fastened to a support 32 which is arranged underneath a cover 33 of the housing. The cover 33 is secured on the housing lid 20 in a suitable manner. On the support 32 an evaluation circuit 34 is positioned opposite the sensor support 31. The evaluation circuit 34 is preferably an ASIC (application specific IC). A connecting cable 35 penetrates the cover 33 and supplies the evaluation circuit 34 as well as the brush 18 with electric current. The cover 30 as well as the housing lid 20 are comprised of electrically non-conducting material, preferably a plastic material.

During operation of the motor, the motor shaft 3 rotates together with the collector plate 13 and the coil 12 fixedly connected thereto. The coil 12 surrounds the permanent magnet 10 and a gap 11 is provided between them. The coil 12 itself is surrounded by the cylindrical wall 6 of the housing cup 1 and an annular gap 36 is provided between them. The transmitter ring 27 provided at the collector plate 13 is a magnet ring and rotates with the collector plate 13. The magnetoresistive sensor 30 positioned at a minimal axial spacing opposite the transmitter ring 27 has two non-represented sensor elements which detect the magnetic field fluctuations resulting from the rotation of the transmitter ring 27 and supply them to the evaluation circuit 34. The evaluation circuit 34 transforms these magnetic field fluctuations into input signals which are supplied to corresponding non-represented terminals for further processing.

The transmitter or magnetic ring 27 is axially magnetized. One pole, for example the south pole, is positioned at the side of the transmitter ring 27 having the teeth 28, while the other pole, for example, the north pole is provided at the side facing the collector plate 13. The presence of the teeth 28 with their teeth tips arranged about the circumference of the transmitter ring 27 causes a magnetic field fluctuation detected by the sensor 30 when the transmitter ring 27 is rotated. The magnetic field fluctuations are transformed by the sensor elements of the sensor 30 into electric current fluctuations. One of the sensor elements of the sensor 30 produces a sine curve while the other sensor element produces a cosine curve that is displaced relative to the sine curve by 90°0. The resulting voltage/rotational angle curves are transformed within the evaluation circuit 34 into rectangular impulses which are supplied to the terminals of the evaluation circuit 34 for further processing. When the transmitter ring 27 has 64 teeth 28, then 64 sine and cosine periods are detected for each revolution of the transmitter ring 27 by the sensor 30 and are transformed in the evaluation circuit 34 into a corresponding number of rectangular impulses by a multiplier circuit. For example, the multiplier circuit can transform the 64 sine, respectively, cosine periods into two sets of 512 rectangular impulses. This allows for a very high angle resolution for such a micromotor. Since the generation of the curves based on magnetic field fluctuations and their transformation into rectangular impulses is known per se, the respective circuit will not be disclosed in detail in this context.

In another non-represented embodiment, the magnetic transmitter ring 27 has no teeth but instead is provided in the circumferential direction with alternating polarity. In this case, the two sensor elements of the magnetoresistive sensor 30 detect the magnetic field changes resulting from the alternating polarity during rotation of the transmitter ring 27 which are then transformed in the evaluation circuit 34 into rectangular impulses.

In the disclosed motor, the transducer including the transmitter ring 27, the magnetoresistive sensor 30, and the evaluation circuit 34 is positioned at least partly within the housing cup 1 of the motor. Accordingly, the motor must not be enlarged in respect to its axial length nor in respect to its diameter. The receiving chamber 21 provided at the free end of the housing cup 1 is used as the mounting space for the transducer. The housing lid 20 receives the magnetoresistive sensor 30 so that for this component no separate mounting space is required. Since the transmitter ring 27 engages the recess or annular groove 29 of the housing lid 20 and the sensor 30 connected to the housing lid is arranged in this area, the axial length, despite the transmitter ring 27 being placed onto the collector plate 13, is not increased by the transducer. Despite the minimal dimensions and the integration of the transducer, an increased resolution is possible with the aforedescribed embodiment. Due to its small dimensions, the motor can be placed into very small mounting spaces.

The projection 16 of the collector plate 13 projects into a central cutout 37 of the housing lid 20 so that the projection 16 does not increase the axial length of the housing and thus of the motor.

The present invention is, of course, in no way restricted to the specific disclosure of the specification and drawing, but also encompasses any modifications within the scope of the appended claims.

What is claimed is:

1. A microelectric motor comprising:

a housing;

a rotatable motor shaft extending axially in said housing;

said housing having an axial length;

a rotor fastened to said motor shaft;

a stator positioned in said housing and cooperating with said rotor;

a receiving chamber provided in said housing within said axial length;

a transducer positioned in said receiving chamber and providing input signals to be further processed for external control and position control.

2. A microelectric motor according to claim 1, wherein said housing has a diameter of 15 mm.

3. A microelectric motor according to claim 1, wherein said axial length of said housing is 18 mm.

4. A microelectric motor comprising:

a housing;

a rotatable motor shaft extending axially in said housing;

said housing having an axial length;

a rotor fastened to said motor shaft;

a stator positioned in said housing and cooperating with said rotor;

a receiving chamber provided in said housing within said axial length;

a transducer positioned in said receiving chamber;

said transducer comprising a transmitter ring fixedly connected to the rotor and a sensor attached to said housing and positioned opposite said transmitter ring.

5. A microelectric motor according to claim 4, wherein said transmitter ring is a magnet ring.

6. A microelectric motor according to claim 5, wherein said magnet ring is axially magnetized.

7. A microelectric motor according to claim 4, wherein said transmitter ring has teeth uniformly distributed about its circumference.

8. A microelectric motor according to claim 4, wherein said transmitter ring has alternating polarity about its circumference.

9. A microelectric motor according to claim 4, wherein said sensor is a magnetoresistive sensor.

10. A microelectric motor according to claim 4, wherein said transducer further comprises an evaluation circuit.

11. A microelectric motor according to claim 10, wherein said evaluation circuit is an ASIC.

12. A microelectric motor according to claim 10, wherein said evaluation circuit transforms signals received from said sensor into rectangular impulses.

13. A microelectric motor according to claim 10, further comprising a support for said evaluation circuit and said sensor, wherein said sensor and said evaluation circuit are connected to opposite sides of said support.

14. A microelectric motor according to claim 13, wherein said housing comprises a cover and wherein said support is positioned inside said cover.

15. A microelectric motor according to claim 4, wherein said housing comprises a lid having a recess and wherein said transmitter ring engages said recess.

16. A microelectric motor according to claim 15, wherein said sensor is arranged in said lid.

17. A microelectric motor according to claim 4, wherein said rotor comprises a collector plate attached to said motor shaft, wherein said transmitter ring is attached to said collector plate.

18. A microelectric motor according to claim 17, wherein said rotor further comprises a coil connected to said collector plate.

19. A microelectric motor according to claim 17, wherein said collector plate comprises a projection having collector lamellas.

20. A microelectric motor according to claim 19, wherein said housing comprises a lid having a cutout and wherein said projection engages said cutout.

* * * * *